United States Patent [19]
Nanbu et al.

[11] Patent Number: 5,915,844
[45] Date of Patent: Jun. 29, 1999

[54] GREASE-LUBRICATED ROLLING BEARINGS

[75] Inventors: Toshikazu Nanbu; Yoshinobu Akamatsu, both of Kuwana, Japan

[73] Assignee: NTN Corporation, Japan

[21] Appl. No.: 08/953,723

[22] Filed: Oct. 17, 1997

[30] Foreign Application Priority Data

Oct. 29, 1996 [JP] Japan ..................................... 8-286570

[51] Int. Cl.$^6$ ..................................................... F16C 33/66
[52] U.S. Cl. .............................................. 384/462; 252/41
[58] Field of Search ............................ 252/41, 565, 56.5; 384/462, 606

[56] References Cited

U.S. PATENT DOCUMENTS 4,859,352  8/1989  Waynick ................................. 252/41
4,879,054  11/1989  Waynick ................................. 252/41

*Primary Examiner*—Lenard A. Footland

[57] ABSTRACT

A grease-lubricated rolling bearing containing an improved grease which can prevent noise of the bearing immediately after the bearing is actuated even at a minimum environmental temperature expected in a cold district (−40° C.). The grease contains a base oil, and a thickener added to the base oil so that the grease has an unworked penetration at −20° C. of 190–290 and, preferably, a worked penetration at 25° C. of 220–310.

4 Claims, No Drawings

GREASE-LUBRICATED ROLLING BEARINGS

BACKGROUND OF THE INVENTION

This invention relates to grease-lubricated rolling bearings used within a wide temperature range, especially grease-lubricated rolling bearings for use in automotive parts provided near an automotive engine such as electric parts and accessories.

A grease-lubricated bearing mounted on an electric part or accessory of an automobile such as an idler pulley or tension pulley is exposed directly or indirectly to radiation heat from the engine, so that its friction surface is heated to about 110° C. The lubricating grease lubricated in the bearing thus is required to be high in high-temperature lubricity and high-temperature durability (or high-temperature life).

In a cold district, such a grease-lubricated bearing may be used at temperatures ranging from −20 to −40°C. Thus, good low-temperature lubricity in addition to high-temperature properties is also required for the grease lubricated in such a bearing.

Conventional grease for bearings that satisfy the above conditions has a worked penetration of 220–310 at 25° C.

One problem with this conventional grease is that it cannot quickly reveal good lubricity inherent to grease if the grease-lubricated bearing is actuated at a low environmental temperature somewhere between 10° C. and −40° C. Thus, immediately after the start, the bearing tends to produce noise.

In the case of a grease-lubricated rolling bearing used in an automotive part, if the automotive engine is started at an environmental temperature of about −40° C., which is not very unusual in winter time in a cold district, the bearing tends to produce noise immediately after the engine is started due to friction between unlubricated sliding surfaces.

This problem of noise in a cold state was not solved by use of a grease having a worked penetration at 25° C. adjusted to 220 to 310.

An object of this invention is to provide a grease-lubricated rolling bearing containing an improved grease which can prevent noise of the bearing immediately after the bearing is actuated even at a minimum environmental temperature expected in a cold district (−40° C.).

SUMMARY OF THE INVENTION

According to this invention, there is provided a grease-lubricated rolling bearing which is lubricated with a lubricating grease comprising a base oil, and a thickener added to the base oil so that the grease has an unworked penetration at −20° C. of 190–290.

There is provided a grease-lubricated rolling bearing for automotive parts, the bearing having a lubricating grease lubricated therein, the lubricating grease comprising a base oil, and a thickener added to the base oil so that the grease has an unworked penetration at −20° C. of 190–290 and a worked penetration at 25° C. of 220–310.

Since the grease lubricated in the rolling bearing according to this invention comprises a base oil and a thickener added to the base oil so that the grease has a predetermined unworked penetration at a low temperature, it is softer than a conventional grease. Thus, it is more likely to penetrate into the bearing for complete lubrication. Even if this bearing is actuated at a low temperature of 10° C. to −40° C., the bearing will not produce noise because no unlubricated sliding surfaces are formed.

The base oil used in the grease according to this invention may be any mineral or synthetic oil, such as mineral oil, synthetic hydrocarbon oil, polyolester oil, polyphenyl ether oil, silicone oil or fluorine oil.

The thickener used in this invention may be any known soap or non-soap thickener that is relatively high in high-temperature durability, such as lithium soap, lithium complex soap, polyurea, or fluororesin.

In adding the thickener and other additives to the base oil, the amount and kind of thickener used, and the cooling speed during manufacture of the grease are controlled so that the unworked penetration (JIS K2220) of the grease at −20° C. will be 190–290 and the worked penetration (JIS K2220) of the grease at 25° C. will be 220–310.

If the unworked penetration at −20° C. is below the above-defined range, the grease will not sufficiently penetrate into the bearing. This lowers lubricating properties of the bearing, making it difficult to suppress noise to a sufficiently low level. If the consistency is above this range, it will be difficult to prevent leakage of grease at normal temperature with an ordinary sealing device. If the worked penetration at 25° C. is below the above range, the bearing lubricating properties at high temperatures will deteriorate to such a degree as to make the bearing useless. If over this range, it will be difficult to prevent leakage of grease with an ordinary sealing device.

DETAILED DESCRIPTION OF THE PREFERRED EMBODIMENT

EXAMPLE 1 OF THE INVENTION 12 parts by weight of an aliphatic urea as a thickener and an antioxidant and an extreme pressure agent were added to 100 parts by weight of a base oil which is a mixture of synthesized hydrocarbon (oil) and an ester-series synthetic oil. The mixture was then agitated and cooled, an oxidation inhibitor was added, and the mixture was homogenized with a three-roll mill. A grease having an unworked penetration (JIS K2220) at −20° C. of 190 and a worked penetration (JIS K2220) at 25° C. of 225 was obtained.

The grease obtained was sealed in a ball bearing, and the bearing noise while the bearing was cold was measured. The results of measurement are shown in Table 1.

(a) Bearing noise in a cold state was measured as follows: ten pulleys in which were mounted grease-lubricated deep-groove ball bearings 6203 were immersed in a low-temperature (−40°C.) tank to cool the bearings to a sufficiently low temperature. Mounted in a bearing assembly kept below room temperature, the pulleys were rotated at 2700 rpm under the radial load of 127N, while simultaneously counting the number of bearings that produced noise having a frequency of 500–1300 Hz and a loudness of over 85 dB, as picked up by a microphone, for every 100 specimens (in percentage).

EXAMPLE 2 OF THE INVENTION

Grease was manufactured in exactly the same manner as in Example 1 above, except that 25 parts by weight of an alicyclic urea as a thickener was added to 100 parts by weight of a base oil which was a mixture of synthetic hydrocarbon and alkyldiphenylether oil. A grease was obtained which had an unworked penetration (JIS K2220) at −20° C. of 204 and a worked penetration at 25° C. of 301.

Using the grease obtained, cold-time noise was measured in exactly the same manner as in Example 1. The results are shown in Table 1.

COMPARATIVE EXAMPLE 1

Grease was manufactured in exactly the same manner as in Example 1 of the Invention, except that 18 parts by weight of an alicyclic urea as a thickener was added to 100 parts by weight of a base oil which was a mixture of synthetic hydrocarbon and ester based synthetic oil so that the grease had an unworked penetration (JIS K2220) at −20° C. of 171 and a worked penetration at 25° C. of 240.

Using the grease obtained, cold-time noise was measured in exactly the same manner as in Example 1. The results are shown in Table 1.

EXAMPLE 2

Grease was manufactured in exactly the same manner as in Example 1 of the Invention, except that 20 parts by weight of an alicyclic urea as a thickener was added to 20 parts by weight of a base oil which was a mixture of synthetic hydrocarbon and ester based synthetic oil so that the grease has an unworked penetration (JIS K2220) at −20° C. of 167 and a worked penetration at 25° C. of 235. Using the grease obtained, cold-time noise was measured in exactly the same manner as in Example 1. The results are shown in Table 1.

As shown in Table 1, Comparative Examples 1 and 2, both having an unworked penetration at −20° C. of 167–171 which is lower than the predetermined range, though their worked penetration at 25° C. was within the predetermined range, i.e. 235–240, were extremely high in the noise production rate at 40° C., that is, 41–55%.

In contrast, the greases of Example 1 and 2 of the Invention, having an unworked penetration at −20° C. of 190–204 and a worked penetration at 25° C. of 225–301, were very low in noise production rate at −40° C., i.e. 6–10%.

According to this invention, as described above, a thickener is added to a base oil so that an unworked penetration will be within the above-described range at a low outdoor temperature, and the lubricating grease thus obtained is sealed in a rolling bearing. The grease-lubricated bearing thus obtained can be lubricated quickly and thus produces little noise even immediately after the bearing is actuated at a minimum outdoor temperature expected in a cold district (−40° C.).

TABLE 1

|  | Unworked penetration (−20° C.) | Worked penetration (25° C.) | Noise production rate (%) |
|---|---|---|---|
| Example 1 | 190 | 225 | 6 |
| Example 2 | 204 | 301 | 10 |
| Comparative Example 1 | 171 | 240 | 55 |
| Comparative Example 2 | 167 | 235 | 41 |

What is claimed is:

1. A grease-lubricated rolling bearing for automotive parts which is lubricated with a lubricating grease comprising a base oil, and a urea as a thickener added to said base oil so that the grease has an unworked penetration at −20° C. of 190–290.

2. The grease-lubricated roller bearing for automotive parts according to claim 1, wherein the urea is an alicyclic urea.

3. The grease-lubricated roller bearing for automotive parts according to claim 1, wherein the urea is an aliphatic urea.

4. A grease-lubricated rolling bearing for automotive parts, said bearing having a lubricating grease sealed therein, said lubricating grease comprising a base oil, and a area as a thickener added to said base oil so that the grease has an unworked penetration at −20° C. of 190–290 and a worked penetration at 25° C. of 220–310.

* * * * *